United States Patent
Rothenberg

(10) Patent No.: US 11,295,759 B1
(45) Date of Patent: Apr. 5, 2022

(54) METHOD AND APPARATUS FOR MEASURING DISTORTION AND MUFFLING OF SPEECH BY A FACE MASK

(71) Applicant: Acoustic Mask LLC, Kensington, MD (US)

(72) Inventor: Martin Rothenberg, Jamesville, NY (US)

(73) Assignee: Acoustic Mask LLC, Kensington, MD (US)

( * ) Notice: Subject to any disclaimer, the term of this patent is extended or adjusted under 35 U.S.C. 154(b) by 0 days.

(21) Appl. No.: 17/163,422

(22) Filed: Jan. 30, 2021

(51) Int. Cl.
| | | |
|---|---|---|
| *G10L 25/60* | (2013.01) | |
| *G10L 25/18* | (2013.01) | |
| *G10L 25/15* | (2013.01) | |
| *G10L 25/75* | (2013.01) | |
| *G01N 29/44* | (2006.01) | |
| *G01H 15/00* | (2006.01) | |
| *G01N 29/12* | (2006.01) | |
| *G10L 21/10* | (2013.01) | |
| *G01H 17/00* | (2006.01) | |

(52) U.S. Cl.
CPC ............ *G10L 25/60* (2013.01); *G01H 15/00* (2013.01); *G01H 17/00* (2013.01); *G01N 29/12* (2013.01); *G01N 29/4436* (2013.01); *G10L 21/10* (2013.01); *G10L 25/15* (2013.01); *G10L 25/18* (2013.01); *G10L 25/75* (2013.01); *G01N 2291/015* (2013.01); *G01N 2291/0237* (2013.01)

(58) Field of Classification Search
CPC ......... G10L 25/60; G10L 25/18; G10L 21/10; G10L 25/15; G10L 25/75; G01H 15/00; G01H 17/00; G01N 29/12; G01N 29/4436; G01N 2291/015; G01N 2291/0237
USPC .......................................................... 73/579
See application file for complete search history.

(56) References Cited

U.S. PATENT DOCUMENTS

| | | | |
|---|---|---|---|
| 4,862,503 | A | 8/1989 | Rothenberg |
| 4,909,261 | A | 3/1990 | Rothenberg |
| 5,454,375 | A | 10/1995 | Rothenberg |
| 5,717,828 | A | 2/1998 | Rothenberg |
| 6,134,529 | A | 10/2000 | Rothenberg |
| 6,358,054 | B1 | 3/2002 | Rothenberg |
| 6,850,882 | B1 | 2/2005 | Rothenberg |

(Continued)

OTHER PUBLICATIONS

Liu, Z., Zhang, X., Mao, Y., Zhu, Y. Y., Yang, Z., Chan, C.T., and Sheng, P., (2000) Locally Resonant Sonic Materials, Science 289(5485), pp. 1734-1736 (Year: 2000).*

(Continued)

*Primary Examiner* — Lisa M Caputo
*Assistant Examiner* — Rose M Miller

(57) ABSTRACT

Systems and methods are provided for measuring the distortion and muffling caused by a face mask. For example, in one embodiment a simulated voice source produces a sound. The sound is then acoustically coupled to a simulated vocal tract and a face mask. A microphone receives sound and produces a signal and an analyzer receives the signal from the microphone. A manikin head or other facial structure may also simulate fitting of the face mask onto a face. The analyzer may further produce a quantitative assessment of the distortion and muffling of the face mask, for example, by comparing at least one spectrum obtained with the face mask and at least one spectrum obtained without the face mask.

22 Claims, 14 Drawing Sheets

(56) References Cited

U.S. PATENT DOCUMENTS

| | | | |
|---|---|---|---|
| 8,423,368 | B2 | 4/2013 | Rothenberg |
| 9,437,116 | B2 | 9/2016 | Rothenberg |
| 2011/0082697 | A1 | 4/2011 | Rothenberg |
| 2011/0093262 | A1* | 4/2011 | Wittke ............ G10K 11/17885 704/226 |

OTHER PUBLICATIONS

Miller, D. G., Sulter, A. M., SChuttle, H. K., Wolf, R. F. (1997) Comparison of vocal tract formants in singing and nonperiodic phonation, Journal of Voice, 11(1), 1-11 (Year: 1997).*
Sondhi, M. M. (1975). Measurement of the glottal waveform. The Journal of the Acoustical Society of America, 57(1), 228-232.
Hillenbrand, J. M. (2011). Acoustic Analysis of Voice: A Tutorial. Perspectives on Speech Science and Orofacial Disorders, 21(2), 31-43.
Palmiero, A. J., Symons, D., Morgan, J. W., Shaffer, R. E. (2016). Speech intelligibility assessment of protective facemasks and air-purifying respirators. Journal of Occupational and Environmental Hygiene, 13(12), 960-968.
Rothenberg, M. (1973) A new inverse-filtering technique for deriving the glottal air flow waveform during voicing. The Journal of the Acoustical Society of America, 53(6), 1632-1645.
Van Cott, H.P., Kinkade, R. G. (1972). Human engineering guide to equipment design, Chapter 5. Washington: Dept. of Defense; for sale by the Supt. of Docs., U.S. Govt. Print. Off.
Peterson, G. E., Barney, H. L. (1951). Control Methods Used in a Study of the Vowels. The Journal of the Acoustical Society of America, 23(1).
Nicolas Sturmel, Christophe d'Alessandro, Boris Doval (2006). A Spectral Method for Estimation of the Voice Speed Quotient and Evaluation Using Electroglottography.
Radonovich, L. J., Yanke, R., Cheng, J., Bender, B. (2009). Diminished Speech Intelligibility Associated with Certain Types of Respirators Worn by Healthcare Workers. Journal of Occupational and Environmental Hygiene, 7(1), 63-70.
Liu, Z., Zhan, J., Fard, M., Davy, J. L. (2017). Acoustic properties of multilayer sound absorbers with a 3D printed micro-perforated panel. Applied Acoustics, 121, 25-32.
Martin Rothenberg and Harm K. Schutte (2015). Interactive Augmentation of Voice Quality and Reduction of Breath Airflow in the Soprano Voice. Journal of Voice, 30 (6).
Michal Borsky, Daryush D. Mehta, Julius P. Gudjohnsen, Jon Gudnason (2016). Classification of Voice Modality using Electroglottogram Waveforms. INTERSPEECH 2016, 3166-70.
Mark R. P. Thomas, Jon Gudnason, Patrick A. Naylor (2012). Estimation of Glottal Closing and Opening Instants in Voiced Speech Using the YAGA Algorithm. IEEE Transactions on Audio, Speech, and Language Processing, 20 (1).
Joao P. Cabral (2018). Estimation of the asymmetry parameter of the glottal flow waveform using the electroglottographic signal. Interspeech 2018, pp. 2997-3001.
Nathalie Henrich, Christophe d'Alessandro, Boris Doval, Miche'le Castellengo (2004). On the use of the derivative of electroglottographic signals for characterization of nonpathological phonation. J. Acoust. Soc. Am. 115 (3).
Martin Rothenberg (1992). A Multichannel Electroglottograph. Journal of Voice, 6(1), pp. 36-43.
Pabst, F. and Sundberg, J. (1992). Tracking Multi-Channel Electrogloitograph Measurement of Larynx Height in Singers, STL-QPSR No. 1, pp. 67-78.
Hertegard, S. and Gauffin, J. (1992). Acoustic properties of the Rothenberg mask. STL-QPSR No. 2-3, pp. 9-18.
Badin, P., Hertegard, S., & Karlsson, I. (1990): "Notes on the Rothenberg mask," STL-QPSR No. 1, pp. 1-7.
Martin Rothenberg (2014). Rethinking The Interpolation Method For Estimating Subglottal Pressure.
Martin Rothenberg (2009). Voice Onset Time vs. Articulatory Modeling for Stop Consonants. Journal Logopedics Phoniatrics Vocology, vol. 34, 171-180.
Stefan Auberg, Nelson Correa, Martin Rothenberg, Mark Shanahan (1998). Vowel and Intonation Training in an English Pronunciation Tutor (1998). ETRW on Speech Technology in Language Learning, Marholmen, Sweden.
Prathosh A. P., Sujith P, Ramakrishnan A. G., Prasanta Kumar Ghosh (2016). Cumulative Impulse Strength for Epoch Extraction. IEEE Signal Processing Letters, 23(4).
Martin Rothenberg (1984). Source-Tract Acoustic Interaction and Voice Quality. Transcripts of the Twelfth Symposium: Care of the Professional Voice, The Julliard School, New York City, Jun. 6-10, 1983, The Voice Foundation, New York, NY, pp. 15-31.
M. Rothenberg, and R. T. Verrillo (1976). Vibrotactile frequency for encoding speech parameters. The Journal of the Acoustical Society of America 59, S69 (1976).
Martin Rothenberg (2014). Rethinking Nasalance and Nasal Emission.
Stephen A. Zahorian, Martin Rothenberg (1981). Principal-Components Analysis for Low-Redundancy Encoding of Speech Spectra. The Journal of the Acoustical Society of America 69, 832.
Stevens K,N., House A.S. (1958). Estimation of Formant Band Widths from Measurements of Transient Response of the Vocal Tract. Journal of Speech and Hearing Research, 1(4), 309-315.

* cited by examiner

METHOD AND APPARATUS FOR MEASURING DISTORTION AND MUFFLING OF SPEECH BY A FACE MASK

BACKGROUND OF THE INVENTION

1. Field of the Invention

The invention relates to a testing and measurement apparatus and method, and particularly to a testing and measurement apparatus and method for measuring and testing the distortion and muffling caused by a face mask.

2. Description of the Related Technology

Face masks (or "masks") are any protective coverings that cover the mouth and nose of the user. Other types of face masks additionally cover the eyes, or just the nose and eyes. There are a number of situations in which it is necessary to filter the air entering or exiting the mouth and nose. Accordingly, there are a number of different kinds of face masks, depending on the application.

One type of face mask is the respirator, also known as a "mechanical filter respirator," "filtering facepiece respirator," "surgical/medical/healthcare respirator" and the like (all herein referred to as "respirators"). Respirators are designed to protect the user from inhaling hazardous atmospheres, including airborne pathogens, fumes, vapours, gases, or any particulate matter (such as dusts). One common respirator is the N95 mask, meets the U.S. National Institute for Occupational Safety and Health (NIOSH) N95 classification of air filtration, meaning that it filters at least 95% of airborne particles (particulate matter). The N95 mask requires a fine mesh of synthetic polymer fibers, specifically a nonwoven polypropylene fabric, and is produced by melt blowing and forms the inner filtration layer that filters out hazardous particles. Respirators, such as N95 respirators are common for industrial use, such as N95 respirators that were originally designed for industrial use in sectors such as mining, construction, painting, and nanotechnology. Respirators are also common in healthcare. In the United States, the Occupational Safety and Health Administration (OSHA) requires healthcare workers performing activities with those suspected or confirmed to be infected with COVID-19 to wear respiratory protection, such as an N95 respirator, and the CDC recommends the use of respirators with at least N95 certification to protect the wearer from inhalation of infectious particles including *Mycobacterium tuberculosis*, avian influenza, severe acute respiratory syndrome (SARS), pandemic influenza, and Ebola.

Another type of face mask is the surgical mask. A surgical mask is a loose-fitting, disposable device that creates a physical barrier between the mouth and nose of the wearer and potential contaminants in the immediate environment. If worn properly, a surgical mask is meant to help block large-particle droplets, splashes, sprays, or splatter that may contain viruses and bacteria. Surgical masks may also help reduce exposure of the wearer's saliva and respiratory secretions to others.

Another type of mask is the cloth face mask. Cloth face masks are made of common fabrics, textiles, usually cotton, worn over the mouth and nose. Although they are less effective than surgical masks or N95 masks, they are used by the general public in household and community settings as perceived protection against both infectious diseases and particulate air pollution. For these reasons, cloth face masks are generally recommended by public health agencies only for disease source control in epidemic situations. Cloth masks may be made from materials as simple as cotton, and may be fashioned from common clothing materials, such as from a shirt or bandana. Cloth masks may also be formed of polymers for more specific applications.

Another type of face mask is the self-contained breathing apparatus ("SCBA"), which are worn to provide breathable air in an atmosphere that is immediately dangerous to life or health atmosphere. These face masks are most often worn by firefighters, in industry, in underwater uses, and other applications. SCBAs designed for underwater use are typically referred to as designed for use under water, it is also known as a SCUBA (self-contained underwater breathing apparatus) masks. The term "SCBA" as used here includes "SCUBA," unless otherwise noted. The term "self-contained" means that the SCBA is not dependent on a remote supply of breathing gas (e.g., through a long hose). Instead, SCBAs typically have three components: a high-pressure tank, a pressure regulator, and a face mask. While the term "SCBA" would typically refer to the system comprising face mask, high-pressure tank, and pressure regulator, the terms as used here refer to only the face mask, and the terms "SCBA set" refers to the complete system. SCBA sets fall into one of two categories: open-circuit or closed-circuit. Open-circuit SCBA sets are filled with filtered, compressed air, rather than pure oxygen. Typical open-circuit systems have two regulators; a first stage to reduce the pressure of air to allow it to be carried to the mask, and a second stage regulator to reduce it even further to a level just above standard atmospheric pressure. This air is then fed to the mask via either a demand valve (activating only on inhalation) or a continuous positive pressure valve (providing constant airflow to the mask). Open-circuit SCUBA sets allow the diver to inhale from the equipment, and all the exhaled gas is exhausted to the surrounding water. This type of equipment is relatively simple, economical and reliable.

The closed-circuit type, also known as a rebreather, operates by filtering, supplementing, and recirculating exhaled gas. It is used when a longer-duration supply of breathing gas is needed, such as in mine rescue and in long tunnels, and going through passages too narrow for a big open-circuit air cylinder. Closed-circuit (or semi-closed circuit) SCUBA sets allow the diver to inhale from the set, and exhales back into the set, where the exhaled gas is processed to make it fit to breathe again. This equipment is efficient and quiet.

Regardless of the type, SCBAs are typically "fullface masks" which are also known as "fullface respirators." Fullface masks cover the entire face or substantially the entire face. Fullface masks are used when the hazard can penetrate through or irritate skin or eyes, such as common in firefighting, several industries requiring the use of hazardous chemicals, toxic cleanup, military, and underwater diving. SCBAs are typically "hard-walled," e.g., made from a plastic, rubber, soft silicone, tempered glass, or the like. SCBAs for firefighting applications are additionally confined to heat-resistant materials.

Other types of face masks include oxygen masks (a piece of medical equipment that assists breathing by providing a method to transfer breathing oxygen gas from a storage tank to the lungs), anesthetic masks, dust masks, burn masks (a piece of medical equipment that protects the burn tissue from contact with other surfaces, and minimizes the risk of infection), masks that protect against weather (such as ski masks), face shields, protective masks (as worn by law enforcement and military personnel), gas masks, and welding masks. The above described masks are not an exhaustive list and is provided for illustrative purposes only. Other types of masks, including combinations and variations of the above described masks, are commonly known and are equally applicable to the present invention.

Face masks allow varying amounts of air to pass through the wall of the mask. Face masks that allow little to no air to pass (for example, SCBAs and gas masks, in the extreme case) often include a ventilation valve, also commonly referred to as an exhalation valve, ventilation hole, voice or speaking diaphragm, or the like. This is because the face mask does not allow enough air to pass through the mask wall to allow the user to breathe sufficiently. A filter is often included within the ventilation valve. As used herein, the term ventilation valve means any valve, hole, opening, or the like, that allows the user to better breathe (either exhaling, inhaling, or both).

As described herein, the term "air impervious" is used to refer to a face mask wall material that allows little to no air to pass and therefore requires a ventilation valve. Such materials include, but are not limited to, rubbers and hard plastics. Of course, a material may be air impervious and not require a ventilation valve if the mask wall is not tight-fitting or otherwise allows air to pass around the edges of the face mask wall. For example, a loose-fitting mask will usually allow sufficient intake of air such that a ventilation valve is not needed, even when an air impervious mask wall material is used. As another example, face shields provide another exception because the chamber formed by face shields typically allow air to pass around the edges of the face shield wall (face shields typically provide protection from airborne pathogens despite allowing air to pass around its perimeter by providing fullface protection). Thus, face shield walls are typically comprised of an air impervious material (such as a hard plastic), and yet do not usually require a ventilator. The term "air transmissive" is used to refer to a face mask wall material that does not require a ventilation valve for the user to sufficiently breathe because the material of the mask wall sufficiently allows air to pass. For example, N95 respirators and face masks made of textiles are non-limiting example of materials that allow air to pass through the face mask wall.

One common problem associated with face masks is that they distort and muffle the speech of the user. This distortion and muffling can reduce the ability of the user to communicate. For example, healthcare workers are often required to effectively communicate and wear a face mask simultaneously. Healthcare workers may be hindered in performing their duties if they are not effectively able to communicate, and personnel in other industries are similarly affected. Furthermore, outbreaks of airborne pathogens may cause governmental bodies to mandate or require people to wear face masks in public. Employers may also implement such measures. In these cases, large numbers of people may be communicating while wearing face masks, such as at work, restaurants, retail stores, on public transportation, and at public and private events or gatherings, for example. In these situations, it is common for the speech distortion of the face masks to cause the wearer to remove the face mask while speaking, eliminating the purpose of the face mask by allowing unfiltered air to enter and exit the mouth of the user, potentially worsening the spread of the pathogen.

Recently, the effect of face masks on speech was quantified for several face masks used by heathcare workers. See Palmiero, Andrew J., et al. "Speech Intelligibility Assessment of Protective Facemasks and Air-Purifying Respirators." *Journal of Occupational and Environmental Hygiene*, vol. 13, no. 12, 2016, pp. 960-968. This study measured speech intelligibility ("SI"), which is the perceived quality of sound transmission, with users wearing a face mask. The results showed that all face masks exhibited SI interference. For example, N95 face masks (for example, the 3M 1870 and 3M 1860) showed SI interference typically differing from baseline by 13% and 17%, respectively, for models tested.

In many applications of face masks, distortion and muffling of the speech caused by the presence of the face mask can have a significant deleterious effect on speech intelligibility. See Radonovich, Lewis J., et al. "Diminished Speech Intelligibility Associated with Certain Types of Respirators Worn by Healthcare Workers." *Journal of Occupational and Environmental Hygiene*, vol. 7, no. 1, 2009, pp. 63-70.

Thus, there is a need for a testing and measurement apparatus and method for measuring the distortion and muffling caused by a face mask. In particular, due to the variability of solutions based on a persons' qualitative assessment of speech intelligibility ("SI"), there is a need for a quantitative testing and measurement apparatus and method for measuring the distortion and muffling caused by a face mask.

It is an object of this invention to provide a method and apparatus for objectively measuring the effect of wearing a face mask on the acoustical properties of speech.

All publications, patents, and patent applications mentioned in this specification are herein incorporated by reference to the same extent as if each individual publication, patent, or patent application was specifically and individually indicated to be incorporated by reference.

SUMMARY OF THE INVENTION

In one embodiment, according to an advantageous feature of the invention, a system for measuring the distortion and muffling caused by a face mask, comprises a simulated voice source, configured to produce a sound, a simulated vocal tract, acoustically coupled to the simulated voice source, a face mask, acoustically coupled to the simulated vocal tract, a microphone, configured to produce a signal, and an analyzer, configured to receive the signal from the microphone. In one embodiment, the system can further include a manikin head or other facial structure configured to simulate fitting of the face mask onto a face. The analyzer may further produce a quantitative assessment of the distortion and muffling of the face mask. Such a quantitative assessment of the distortion and muffling of the face mask may be produced by comparing at least one spectrum obtained with the face mask and at least one spectrum obtained without the face mask.

The analyzer may further produce a quantitative assessment of the distortion and muffling of the face mask by comparing at least one spectrum obtained with the face mask and a control. The analyzer may also use an inverse filter. In one embodiment, the analyzer may produce a metric of the distortion and muffling of the face mask. The analyzer may further measure at least one of a frequency, amplitude, or bandwidth of a formant. The analyzer may assess the distortion and muffling of the face mask by measuring at least one of a shift in frequency, change in amplitude, or bandwidth damping of a formant. In one example, the analyzer assesses the distortion and muffling of the face mask by measuring at least one of a shift in frequency, change in amplitude, or bandwidth damping of a formant caused by the face mask by providing at least one such measurement with the face mask in place and another such measurement without the face mask in place. The system may further comprise a link between the analyzer and the simulated voice source.

In one embodiment, a method for measuring the distortion and muffling caused by a face mask comprises the steps of: producing a sound with a simulated voice source, providing a simulated vocal tract, acoustically coupled to the simulated voice source, providing a face mask, acoustically coupled to the simulated vocal tract, producing a signal with a microphone, and receiving the signal from the microphone with an analyzer.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Figure 1:
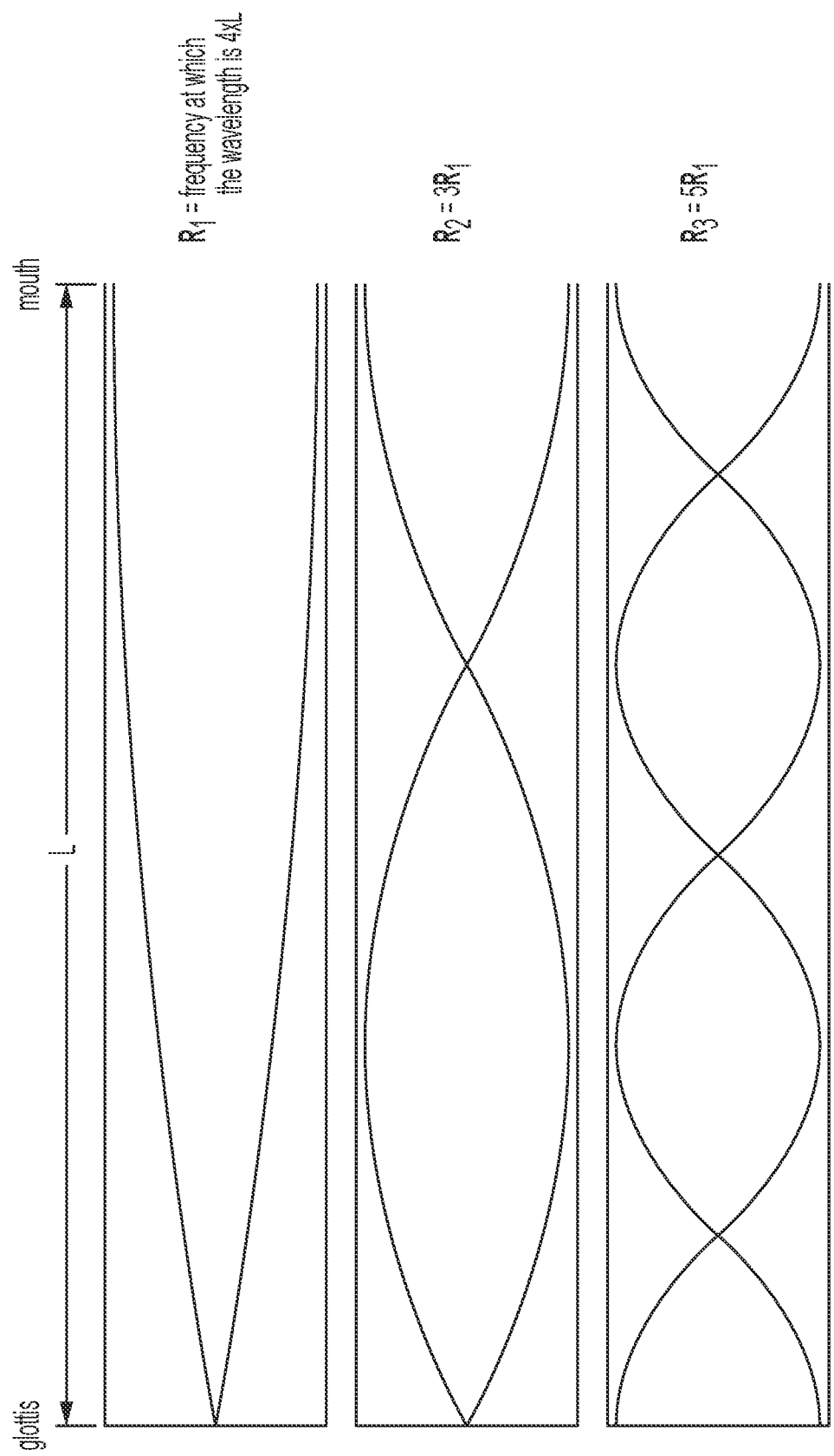
FIG. 1 shows a waveguide modelling the vocal tract.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The acoustic characteristics of speech can be modelled as a sound source, vocal tract filter, and radiation characteristics. The term "vocal tract," or "supraglottal vocal tract" refers to the chambers of the mouth and pharynx above the laryngeal voice source.

In voiced sounds, the sound source is due to the vibrating vocal folds. The energy of the sound source usually comes from air expelled from the lungs, which is converted to acoustic energy at the larynx (or "voice box"), as this flow of air passes between the vocal folds.

The shape of the vocal tract can be modelled as the vocal tract filter, and is usually modelled separately from the vocal source. The vocal tract is usually measured from the glottis to the mouth, but can also include the nasal cavity, depending upon whether the velum is open or closed. For example, the nasal sounds such as /m/, /n/, and /ng/ require added resonance in the nasal cavity.

When speech is voiced, the vocal folds vibrate, effectively producing sound waves. Articulators, such as the tongue, teeth, pharynx, jaw and lips, modify the spectrum of those sound waves. Radiation characteristics refer to the way in which sound as a speech pressure waveform radiates from the mouth. Sound production that involves moving the vocal folds close together is called glottal. Voiced (e.g., quasiperiodic) source sounds are glottal, in addition to whisper (e.g., aperiodic). On the other hand, there can be supraglottal sound sources in speech that are aperiodic (i.e., random noise or impulses).

An acoustic filter selectively strengthens or attenuates certain frequencies and allows other frequencies to pass through unstrengthened or unattenuated. During unnasalized voiced speech sounds, that is sounds for which the velar passageway is closed or almost closed, the vocal tract acoustic filter can be effectively characterized by a small number of acoustic resonances. These acoustic resonances in the vocal tract produce peaks in the spectral envelope of the output sound. Thus, the vocal tract is an acoustic filter, and the resonances of the vocal tract produce spectral peaks or formants in the output sound. The term "formant," as used in the art, is used to describe either a spectral peak or a resonance that gives rise to it.

A uniform tube closed at one end and open at the other, is a what is referred to in radio engineering as a quarter-wave resonator, and would have resonance frequencies in a 1, 3, 5, 7 multiplicative sequence. This is illustrated in the standing wave patterns shown in FIG. 1.

The resonances of the vocal tract can be estimated by modeling it as an acoustic waveguide, typically having a length of about 10-20 cm. The cross section along the length of the waveguide is varied by the geometry of the articulators. The frequencies of the resonances depend upon the shape. The frequencies of the first, second, third and ith resonances are called $R_1, R_2, R_3 \ldots, R_i, \ldots$. As shown in FIG. 1, to obtain approximate values of the frequencies of the vocal tract formants, the waveguide modelling the vocal tract can be accurately described as open at one end (representing the mouth), and closed at the other end (representing the glottis). For a linearized vocal tract length the size of that of a typical adult, the lowest resonant frequency $R_1$ would be approximately 500 Hz. $R_2$ and $R_3$ would be 3 and 5 times that value and approximately 1500 Hz and 2500 Hz, respectively.

During the voicing of vowels and voiced sonorant consonants, the area of the glottis is negligible compared to the opening at the lips, especially during the most closed portion of the vibratory cycle, when most of the acoustic energy is generated, so it can be effectively treated as closed in an acoustic analysis. The articulators (such as the tongue, teeth, pharynx, jaw and lips) are able to provide differences in vowel sounds, and produce significant changes in the formant frequencies. In other words, the different vowel sounds can be thought of as modifications to the vocal tract resonance. For example, the opening or closing of the mouth affects the resonance of the vocal tract cavity, as well as the length of the opening formed by the articulators, as shown in FIG. 1. The tongue is an example of an articulator that can lengthen or shorten the vocal tract cavity and vary its cross-sectional area.

Thus, by specifying peaks in the spectrum, formants provide the information that people require to distinguish between speech sounds. The formant with the lowest frequency is called $F_1$, the second $F_2$, and the third $F_3$. Most often the two first formants, $F_1$ and $F_2$, are sufficient to identify the vowel. Formants may be defined by their frequency and by their spectral width, or bandwidth.

For a typical adult person, $F_1$ will usually be between 200-800 Hz. The low end of the range would be realized for vowel pronunciation that requires a small opening of the mouth, whereas the high end of the range typically would be the case with a larger opening of the mouth. The second resonance of an adult vocal tract is typically in the range of 800-2000 Hz. Again, these values vary depending on the vowel pronounced. For example, the vowel /u/ requires a small opening of the mouth, so for a given speaker, $R_2$ may be lower than 800 Hz (e.g., 500 Hz would not be uncommon). As discussed, the articulators (such as the tongue, teeth, pharynx, jaw and lips) are able to provide differences in vowel sounds by producing significant changes in the formant frequencies.

The distortion and muffling of the speech of a face mask user can come from two primary sources: (1) blocking of the speech sounds from the mouth and/or nose, and (2) distortion and muffling of the speech sounds from the mouth and/or nose caused by the face mask.

The second aspect of speech distortion, the modifying or distortion of the speech as it is emitted from the mouth and nose, is caused by the acoustic coupling of the face mask to the vocal tract as well as by resonances (and antiresonances) generated in the mask itself. While most people think that the reduced speech intelligibility caused by wearing a mask is due to the first source (blocking of the speech sounds), the second source (distortion and muffling) is actually the predominant cause.

There are a number of methods used for measuring the frequency and damping of the speech formants. In mathematical terms, a formant is a resonance, defined by a frequency and a damping factor or alternatively, in some descriptions of vocal tract acoustics, a formant is described as a peak in the spectrum of the speech and a center frequency and a bandwidth of that peak. The bandwidth, nominally, the distance in Hz between the −3 dB points preceding and following the peak, can be mathematically derived from the damping factor, and vice versa.

Also, in some applications, a formant is identified by only its frequency. For example, it is only the frequency of a formant that is identified by a spectrographic analysis.

Figure 2:
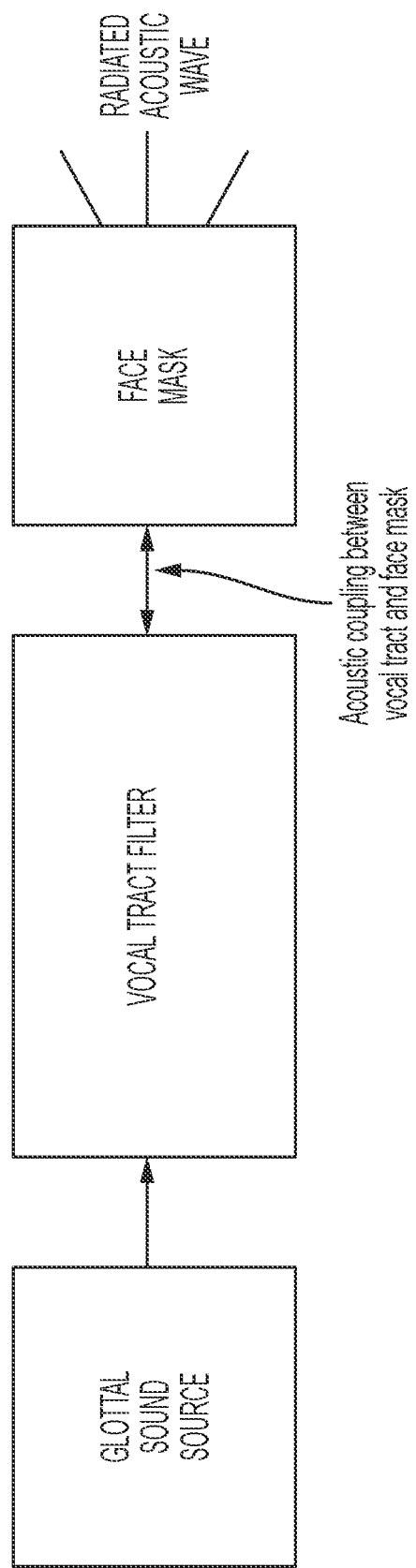
FIG. 2 shows an illustration of the glottal sound source coupling with the vocal tract filter and face mask.
Figure 3:
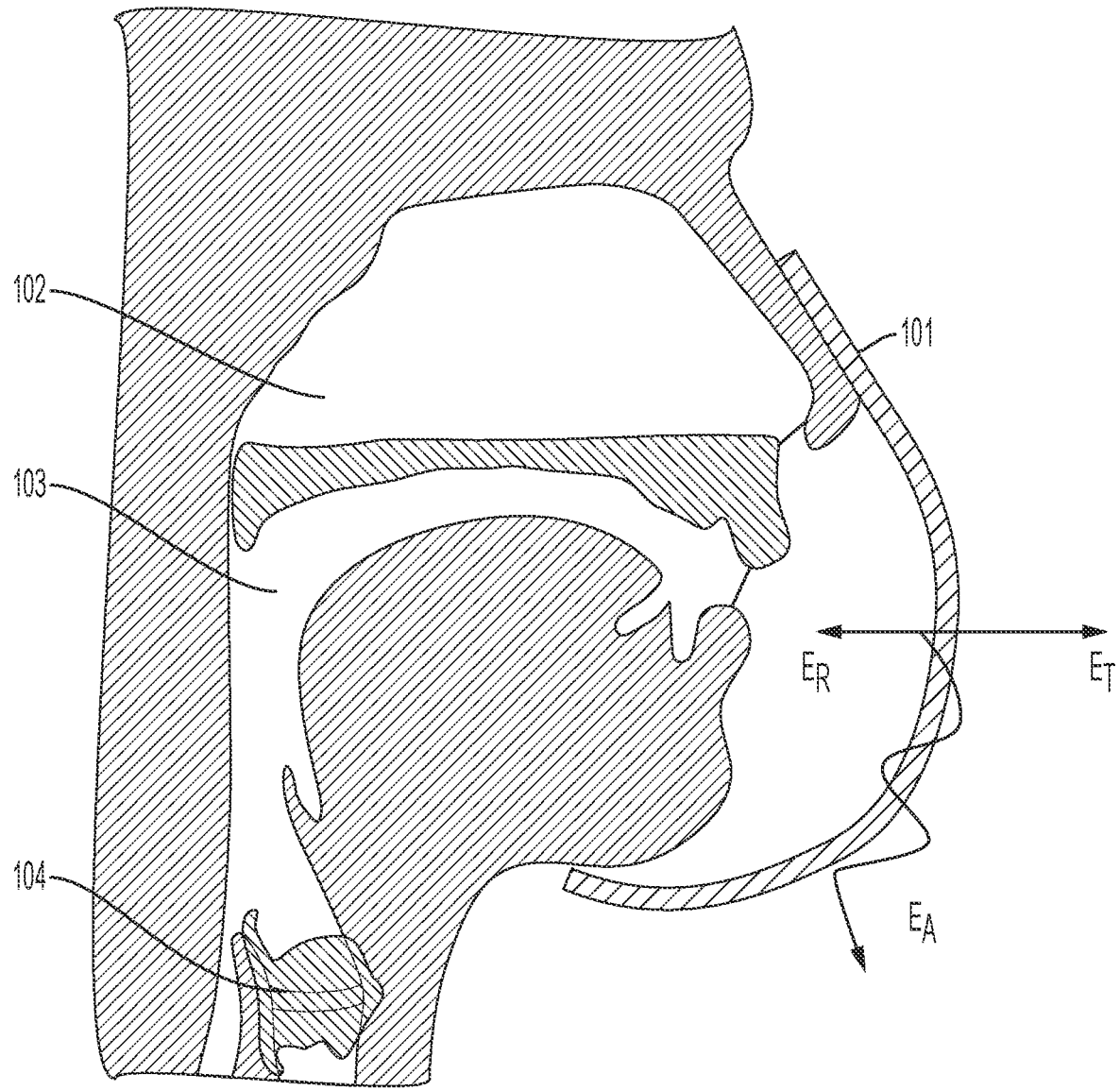
FIG. 3 shows a physical depiction of the glottal sound source coupling with the vocal tract filter and face mask.

As further explained by the experiments shown below, when a face mask is worn on a face, there is a shifting in the frequency of the formants and/or the damping of the formants of the speech emitted from the mouth and nose caused by the acoustic coupling of the mask chambers to the chambers of the mouth and nose, so as to cause a reduction in the intelligibility of the speech. In other words, the natural chamber of the vocal tract produces formants of the voice, and when a face mask is worn, the chamber created over the mouth couples to the vocal chamber, and alters the formants. This effect is depicted in FIGS. 2 and 3. As illustrated in FIG. 2, the glottal sound source couples with the vocal tract filter. With the addition of a face mask, the resonances of the vocal tract filter couple to the face mask, as indicated by the double-arrow. FIG. 3 physically shows this concept. As shown, the vocal folds 104 form one end of the vocal tract 103. Additional resonances of the nasal cavity 102 are also required for nasal sounds (such as /m/, /n/, and /ng/). Without the mask wall 101, the resonances of the vocal tract 103 (and sometimes also the nasal cavity 102) would produce undistorted and unmuffled speech. As shown in FIG. 3, the addition of a mask wall 101 may cause the sound wave energy to behave in one of three ways as it exits the mouth: it may reflect sound energy (ER), it may allow sounds energy to be transmitted (ET), or it may absorb sound energy (EA). The reflected sound energy (ER) caused by the face mask wall causes much of the distortion and muffling of the voice.

When worn, face masks can result in a shifting in the frequency, and/or the damping of the formants of speech emitted from the mouth and nose caused by the acoustic coupling of the mask chambers to the chambers of the mouth and nose (i.e., vocal tract and nasal cavity), and/or an increase or decrease in the spectral peaks generated by one or more formants. In other words, the interior of the mask becomes acoustically part of the vocal tract. This lengthening of the effective vocal tract will tend to lower the formants, with the effect varying with the vowel being spoken. In the tract/mask acoustic system, the departure from the closed-to-open tube model can also add additional resonances and antiresonances to the transfer function, to further muffle the speech.

Figure 4B:
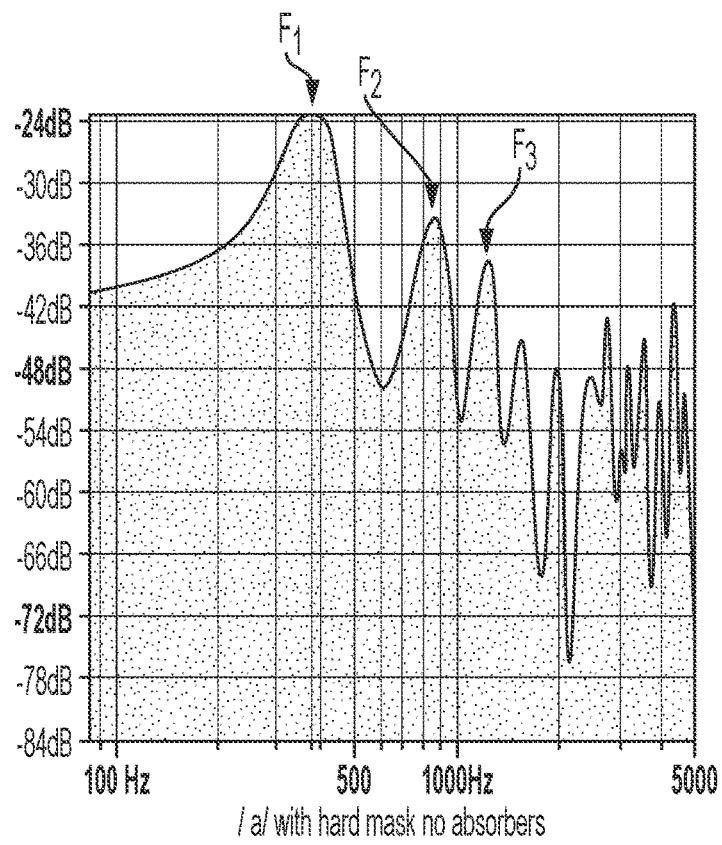
FIG. 4A-4B shows experimental results of distortion and muffling as a result of a face mask.
Figure 4A:
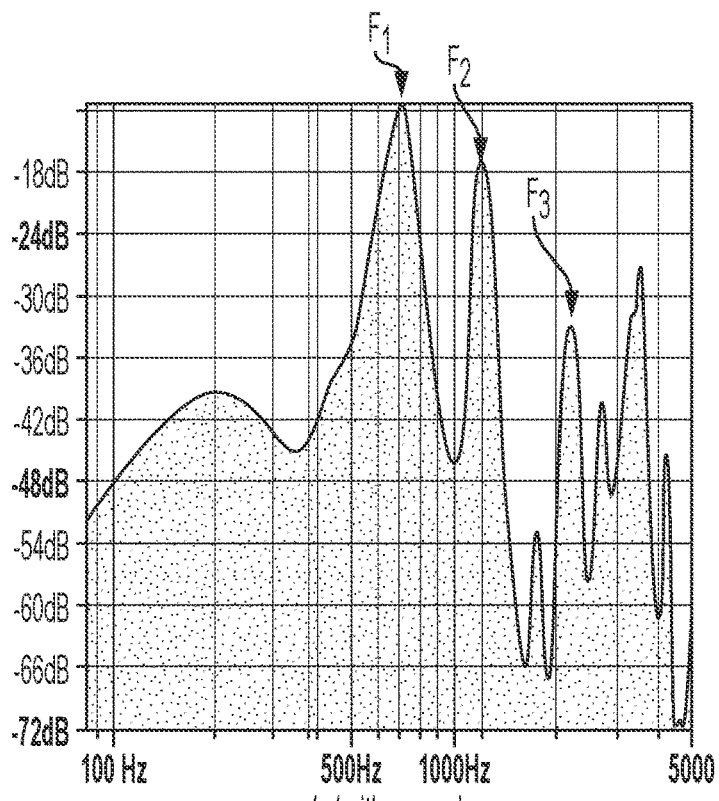

Because most of the information in speech is conveyed by the frequency and damping of the lowest 2 or 3 formants in the speech, it is possible to evaluate the degree of distortion or muffling of the speech caused by the mask by comparing the formant structure of the speech with and without the mask, as in FIGS. 4A and 4B. Changes in formant structure caused by the face mask include a shifting of the frequency of one or more of the formants, an increase or decrease in the peaks of one or more formants, or a broadening or narrowing of one or more of the formant peaks, or a combination. The changes to the formant structure may also result in one or more additional resonances or antiresonances (spectral dips), which may not necessarily be a simple "shift" of one the three formants. For example, the coupling of a first formant of a human vocal tract with a certain face mask may cause a decrease in the formant (e.g., the face mask resonance results in less resonant energy in the first formant), which could be a result of formant energy simply dissipating as a result of the face mask.

A broadening of one or more of the formant peaks is generally known as a "dampening" effect, which may also be accompanied be a decrease in base-to-peak amplitude of one or more of the formant peaks. The terms "distortion" and "muffling" are essentially synonymous in the art. In some applications "muffling" may be more associated with damping effects, while "distortion" may be more associated with shifting effects. As used here, "distortion" and "muffling" are synonymous and may refer to any changes in formant structure caused by the face mask.

While speech intelligibility is primarily determined by the first three formants, distortion or muffing may cause changes in only a single formant, multiple formants, or all formants. Additionally, different formants may be affected in different ways. For example, a particular mask may cause the first formant to see a shift, while the second formant is dampened, and the third formant is unaffected.

FIG. 4 shows an example of distortion and muffling caused by a face mask. The spectra were obtained from an omnidirectional microphone a few inches from the mouth with no mask, shown in FIG. 4A, and a face mask with an air impervious wall, shown in FIG. 4B. The vowel was an unnasalized /a/ as spoken by an adult male English speaker. Analysis was made using the freeware Audacity® Audio Editor.

The speaker attempted identical vowel /a/ sounds in each case, and the first three formants can be seen in both spectra, as labeled. FIG. 4A, shown on the bottom, shows a spectrum with no mask. In this case, narrow-bandwidth peaks are at frequencies typical for the vowel /a/—$F_1$ is centered at about 710 Hz, $F_2$ is centered at about 1210 Hz, and $F_3$ is centered at about 2300 Hz. Distortion and muffling effects of the air impervious walled face mask are evident in the spectrum of FIG. 4B. As shown in FIG. 4B, all three formants shifted to lower frequencies—$F_1$ is now centered at about 380 Hz, $F_2$ is centered at about 880 Hz, and $F_3$ is centered at about 1200 Hz. This accounts for the deep sounding voice common among people wearing face masks. The formants peaks also became broader as a result of the mask, and shifted in amplitude.

The clear spectra in FIG. 4 were obtained by using a very low glottal pulse rate, in what is referred to as an ingressive vocalization. Optimum spectral clarity may be obtained using a single acoustic impulse stimulating the vocal tract. The use of impulses in analyzing acoustic and mechanical systems is well understood in other applications. For example, it has been used in a study of the formant structure of the singing voice, but it has not been applied to analyzing the distortion of speech caused by a mask. The response to an acoustic impulse contains all the acoustic information necessary to measure the distortion and muffling of human voice.

Figure 5A:
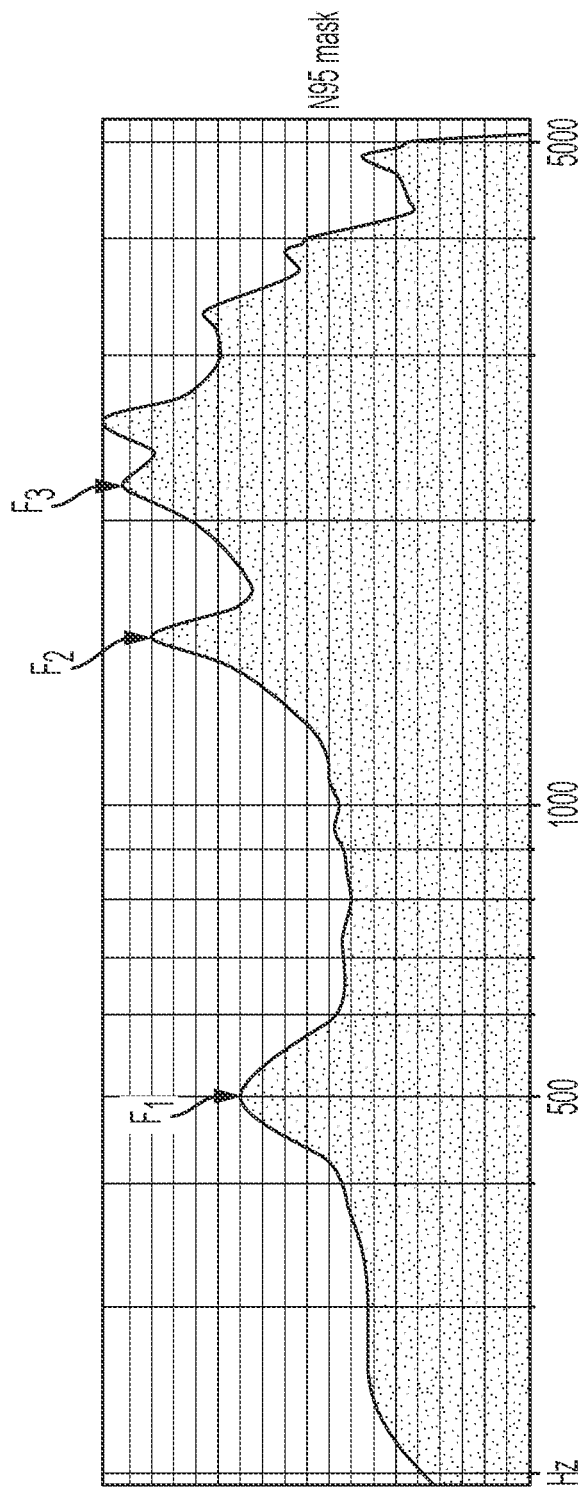
FIG. 5A-5B shows experimental results of distortion and muffling as a result of a face mask.
Figure 5B:
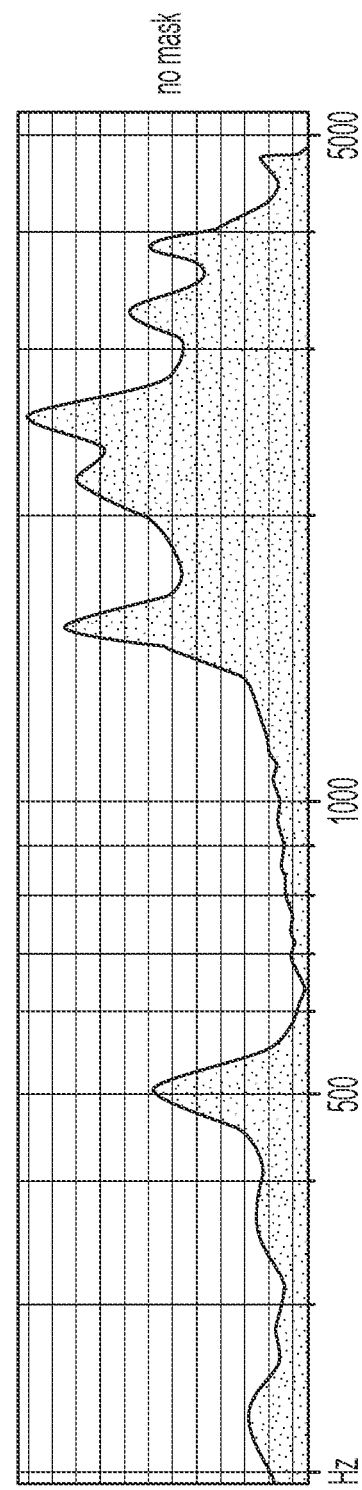

FIG. 5 shows an example of the distortion and muffling caused by a face mask with an air transmissive wall. Spectra were obtained using the same instrumentation as FIG. 4, but an N95 face mask was used (Weini Technology K320t Niosh N95). As shown, this particular face mask resulted in the formants becoming weaker and more damped, as shown by the formant peaks broadening (becoming less narrow), and less pronounced (the formant peak amplitude is smaller when measured from the baseline in between formant peaks). This also agrees with the common quality of less pronounced sounds being perceived when a face mask is worn.

When estimating the distortion of the speech produced with a face mask, a comparison of the spectrum of the speech with and without the mask that includes an estimation of change in formant structure caused by the mask has an advantage over subjective testing of speech intelligibility in that it can yield repeatable objective measures of the muffling of the speech in a short amount of time.

There are a number of methods used for measuring the frequency and damping of the speech formants. In mathematical terms, a formant is a resonance that may, in some cases, be defined by a frequency and a damping factor. In other cases, in some descriptions of vocal tract acoustics, a formant is described as a peak in the spectrum of the speech and a center frequency and a bandwidth of that peak.

In the mathematical specification of a damped resonance, the damping factor is the coefficient of the exponential decay of the sinusoidal oscillations that result from the resonance. The bandwidth, nominally, the distance in Hz between the −3 dB points preceding and following the peak, can be mathematically derived from the damping factor, and vice versa.

Figure 6:
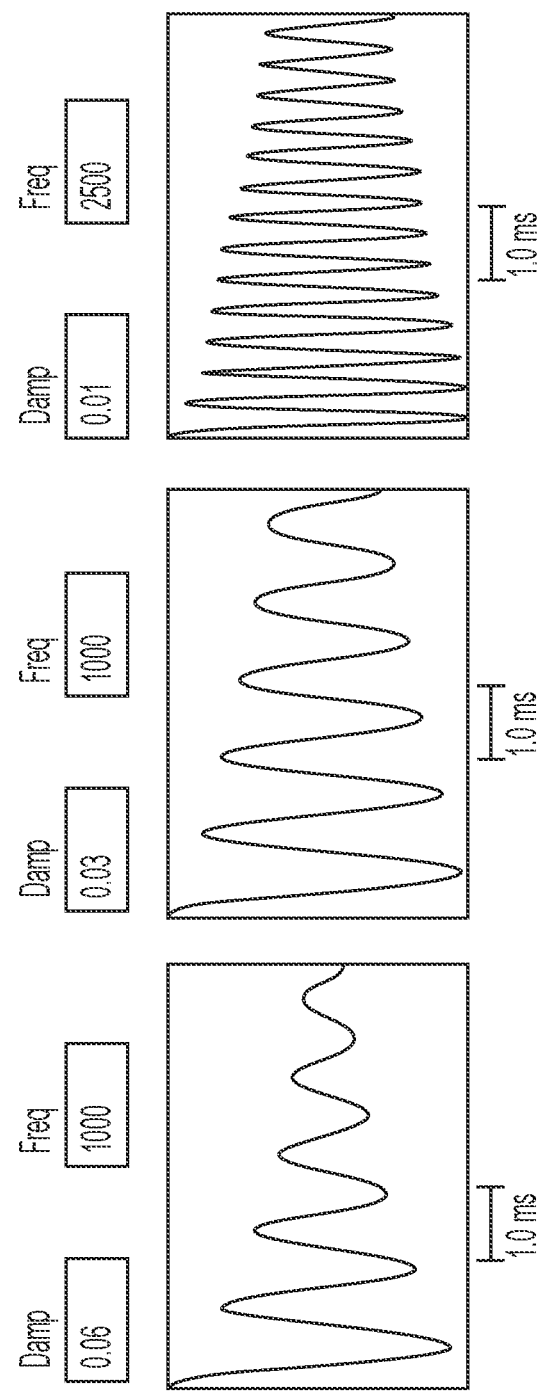
FIG. 6 shows exponentially damped sinusoids with three degrees of damping.

The damping of a resonance can also be described mathematically by the % decay per cycle of oscillation. Rothenberg M. (1973). A new inverse-filtering technique for deriving the glottal air flow waveform during voicing. Journal of the Acoustic Society of America, 53(6), 1632-45. FIG. 6 shows the decaying sinusoid for 3 different values of the damping factor.

The damped sinusoids in FIG. 6 were generated by a computer using the Waveview™ program marketed by Glottal Enterprises.

However, in comparing the spectrum of speech with and without a mask, or with different masks, it must be kept in mind that the there is a natural variability in human speech, that can be reduced by using a trained speaker, but cannot be eliminated. For this reason, it is proposed in this application that such comparisons be preferably made using a synthesized voice generated using a mechanically stimulated physical vocal tract model, such as proposed in this application. Using a physically simulated voice source and vocal tract instead of natural speech thus allows the user to detect and measure the small changes in the spectrum caused by masks that are perceived to muffle the speech of the user but do not cause high levels of distortion.

Among the plurality of tools available for the analysis and comparison of the spectra of the speech with and without a mask is the method of inverse filtering, in which a filter having zeros, or antiresonances, at the frequencies and damping of the resonances underlying a given spectrum is used to cancel such resonances. Inverse filtering could also introduce resonances to cancel antiresonances underlying a given vowel spectrum, as in nasalized speech. Inverse filtering has been widely used to analyze natural speech to study the voice source.

According to an embodiment of the invention, the measurement of the formants of speech is accomplished by generating simulated vowels using a simulated vocal tract that is affixed to a physical model of a human head upon which the mask to be tested can be mounted, as shown diagrammatically in FIG. 3.

Figure 7:
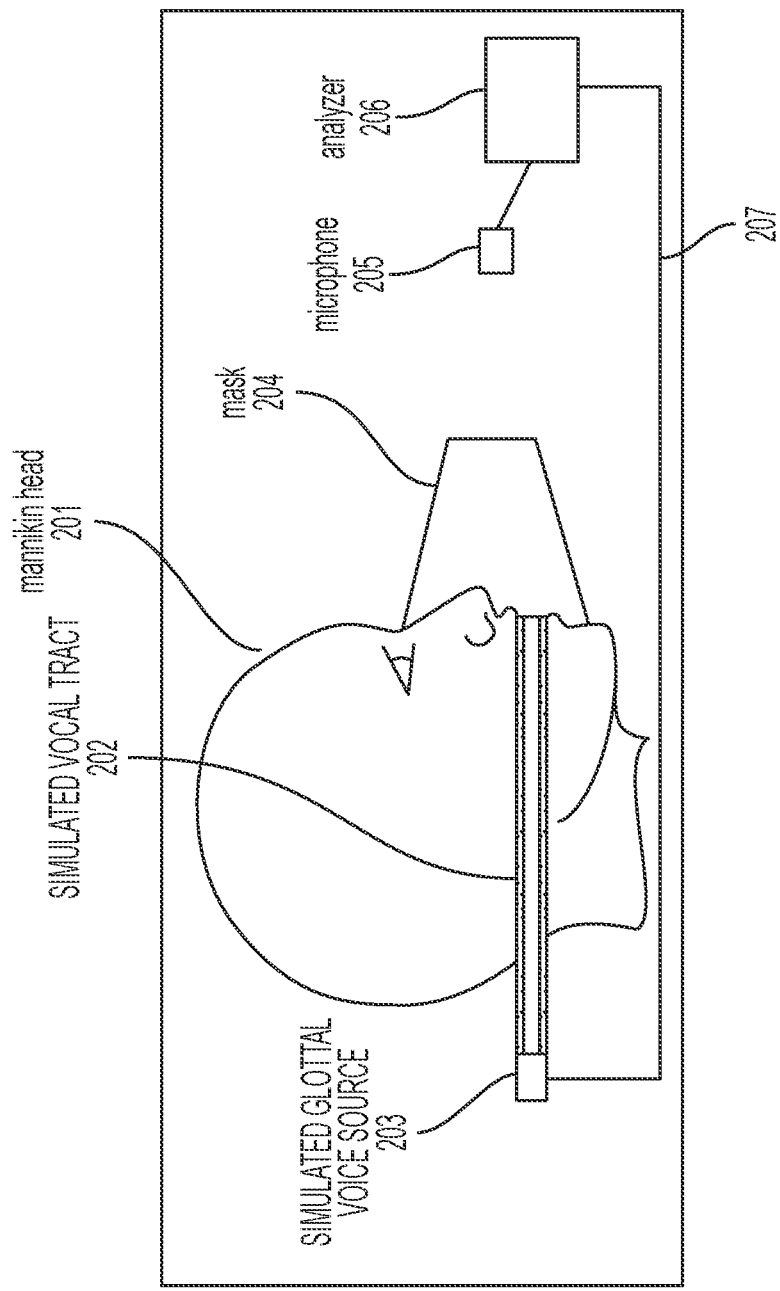
FIG. 7 shows an embodiment that includes a manikin head fitted with a simulated vocal tract and voice source.

FIG. 7 shows one embodiment of the present invention. As shown in FIG. 7, a microphone 205 mounted a fixed distance from the model 201 that picks up the resulting potentially distorted or muffled voice and is connected to an analyzer 206 for analyzing the structure of the resulting sound.

As shown in FIG. 7, model 201 may be a model of the human head suitable for mounting the mask to be tested and amenable to the mounting of a simulated vocal tract. Model 201 may be a mannikin head, mask, or other model of a facial structure that is able to simulate the way the mask 204 would fit onto a human head. Simulated vocal tract 202 is, for example, made of a piece of tubing having a length and cross-sectional area similar to a linearized version of the human vocal tract. A simulated voice source 203, which can be an electroacoustic transducer powered by a function generator, or another source of acoustic energy capable of producing sounds such as acoustic impulses, such as generated by a spark, or alternatively, for example, a sinusoidal acoustic waveform of varying frequency if a sweep tone analysis is to be used.

The voice source 203 should preferably have a high acoustic impedance so as to emulate the glottis during its closed phase, during which there is little or no formant energy absorbed by an open glottis. Formant energy absorbed by a simulated glottis with an impedance not high compared to the impedance of the simulated vocal tract will increase the formant damping and change the resonant frequency of the formant, thus creating errors in the measurements of the effects of the mask being tested.

The simulated voice source 203 is acoustically coupled to the simulated vocal tract 202, such that sound output from simulated voice source 203 is coupled into the simulated vocal tract 202. The sound output from the simulated vocal tract 202 may then acoustically coupled to the mask 204, such that the acoustic effect of the mask 204 can be detected.

In some embodiments, a link 207 may be provided between the analyzer 206 and the simulated voice source 203 to synchronize the analyzer with the voice source, in order to aid in the analysis. The link 207 may provide the analyzer 206 information regarding the sound produced by voice source 203. For example, if the simulated voice source is an acoustic impulse, the link 207 can send the impulse data, and may signal to the analyzer 206 the time that the impulse is generated, so that the analysis can be set to occur over a time interval that begins an advantageous preset time after the impulse.

Mask 204 is the mask to be tested. Microphone 205 is positioned so as to pick up the sound emitted from the simulated vocal tract 202. Microphone 205 may be any device that converts a received sound into a signal for the analyzer 206. If a face mask is in place, the microphone is preferably placed outside of the face mask such that all the effects of the distortion and muffling caused by the mask can be effectively captured.

Analyzer 206 is a system for receiving an output signal from the microphone 205 and performing an analysis that yields a measure or measures of the muffling and distortion of the simulated voice caused by the mask. The analyzer may be a signal processor with circuitry or processors optimized for the operational needs of signal processing. Examples of the type of analysis that can be performed by the analyzer 206 are shown below in FIGS. 11 and 12. Depending on the embodiment, the signal output from microphone 205 may involve different amounts of initial processing.

In one embodiment, the analyzer 206 compares the spectra with and without the face mask 204. The analyzer 206 may also compare the spectra with the mask to any other type of control. For example, the analyzer 206 may be provided the original or control signal generated by the simulated voice source 203 by link 207.

Figure 8:
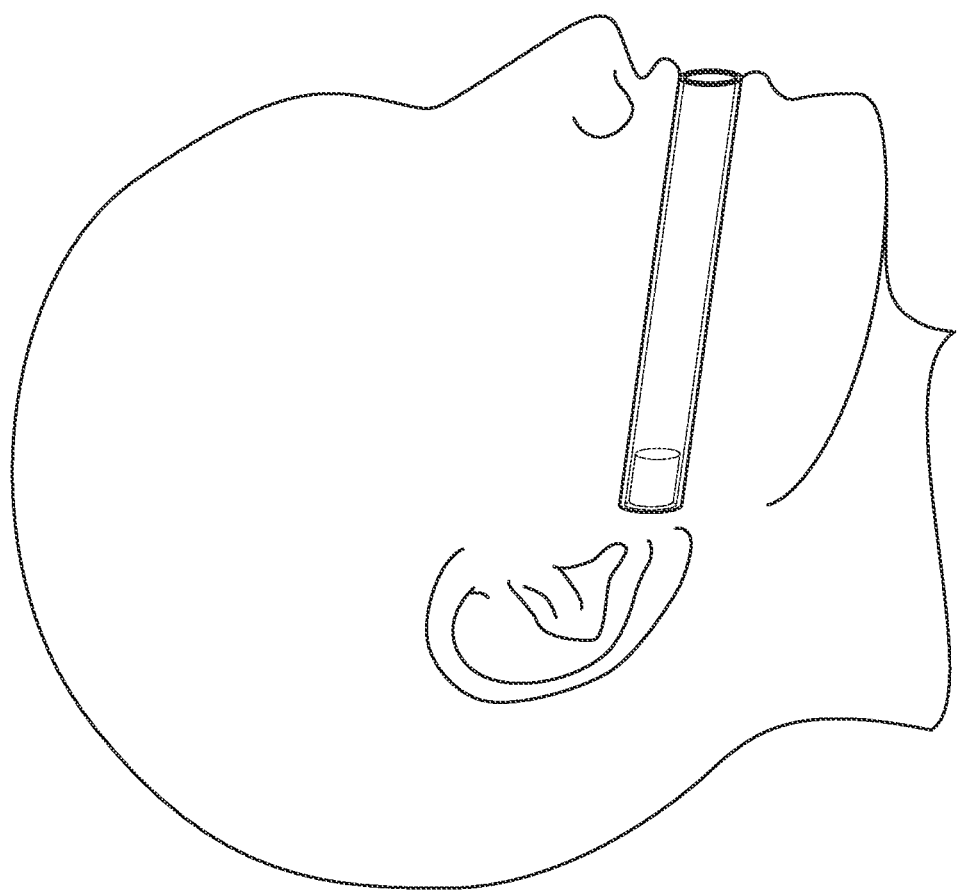
FIG. 8 is a sketch illustration showing how a simulated vocal tract and voice source can be fitted into a manikin head.

With reference to FIG. 7, the acoustic distortion of the speech of a user of a face mask may be measured by affixing the mask to a manikin head 201 or partial manikin head that is fitted to a simulated vocal tract and a simulated glottal voice source, as in the prototype shown diagrammatically in FIG. 8. The manikin head 201 may be any facial structure that simulates the fitting of the mask 4 onto a face.

FIG. 8 shows an embodiment of the simulated vocal tract 202. For the tubing used to simulate the vocal tract, the length of the tubing was chosen to be close to the linearized length of an adult human vocal tract, or roughly 6 inches, and a cross sectional area chosen similar to the average cross-sectional area of an adult vocal tract. The mannikin head we used was a Simulaids Sani-Manikin Replacement head, made by Nasco.

A miniature loudspeaker having a high acoustic impedance at its output was inserted in one end of the tube to emulate the glottal voice source, to function as the simulated voice source 203. However, other sound sources could be used, as a spark-generated acoustic impulse source.

A microphone 205 was mounted a fixed distance, approximately 2 inches, from the manikin face to record the radiated acoustic signal. The signal from the microphone was processed by analyzer 206 in order to determine the distortion of the radiated acoustic waveform caused by the presence of a mask.

Figure 9:
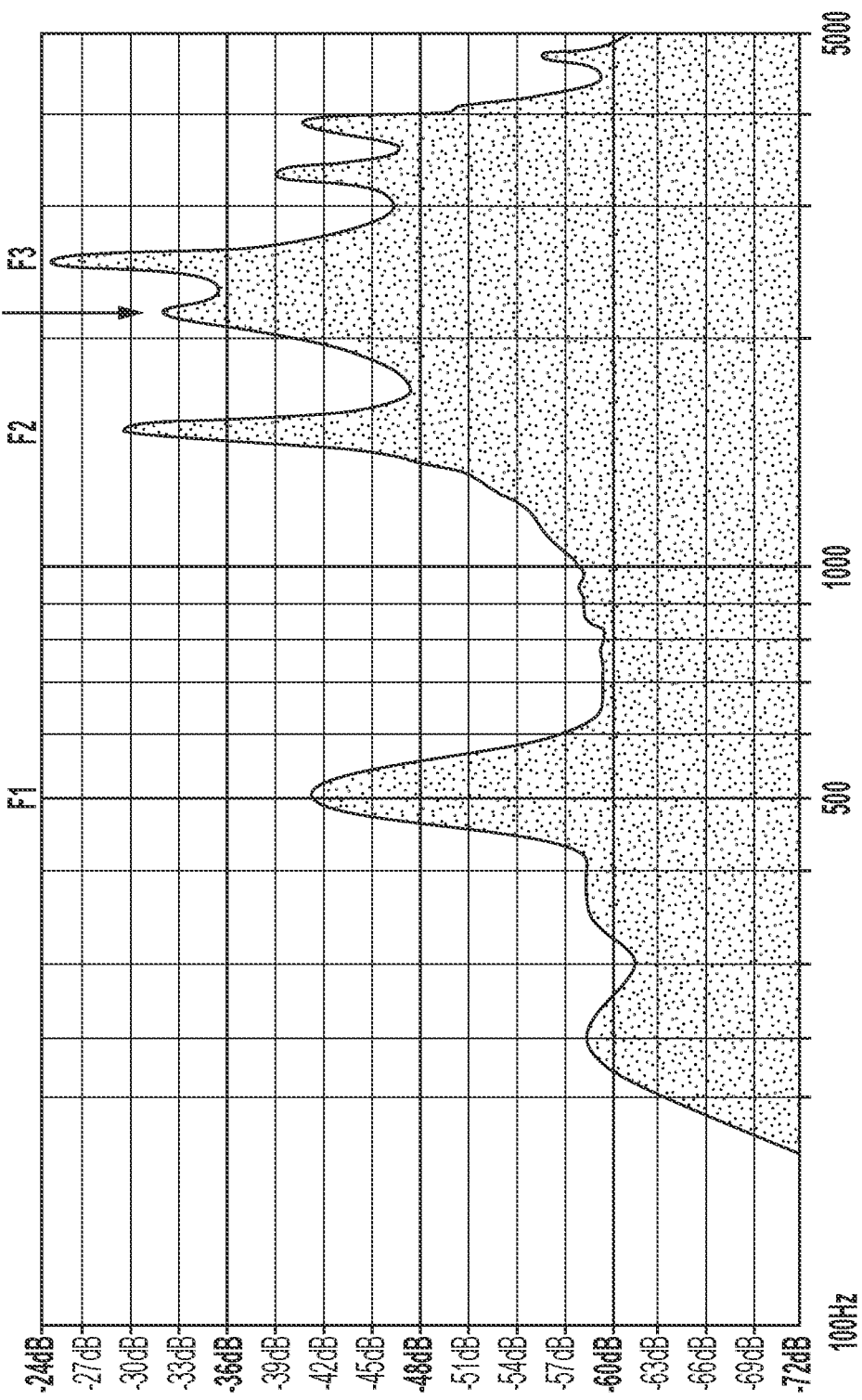
FIG. 9 shows a spectrum measured when a simulated vocal tract was stimulated with an impulse using a miniature loudspeaker.

The spectrum of the synthesized vowel, from the microphone a few inches from the face mouth opening, with no mask in place, is shown in FIG. 9. The signal was filtered below 250 Hz and above 5000 Hz before analysis. The Audacity™ auditory signal editing program was used for filtering and analysis.

The frequency peaks in FIG. 9 near 500, 1500, 2500 and 3500 Hz fit the theoretical model of FIG. 1, and agree with values predictable from the length of the tube used to simulate the vocal tract. The narrow bandwidths indicate little damping, which would be what is expected without a mask. An added resonance near 2100 Hz comes from the natural resonant frequency of the miniature loudspeaker that was used. Thus, any distortion caused by a mask should be clearly evident.

FIG. 10 contains four spectral displays obtained using the prototype testing system described in FIGS. 8 and 9. The simulated voice source in each case was an impulse generated by the minispeaker emulating the voice source.

Figure 10A:
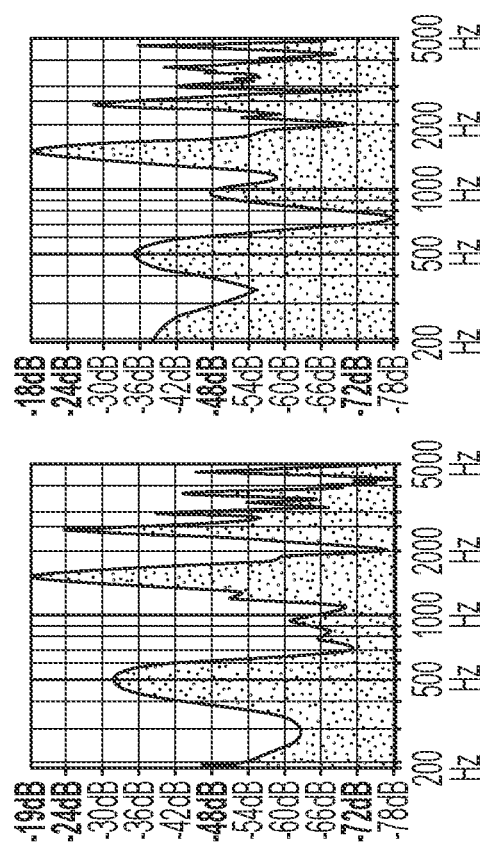
FIG. 10A shows a spectrum resulting from an impulsive stimulus with no face mask in place.

FIG. 10A shows the spectrum of the sound radiated by the simulated vocal tract with no mask in place. Strong formants at 500, 1500, and 2500 Hz are clearly evident, and the bandwidth or damping of each formant could easily be measured from the display.

Figure 10B:
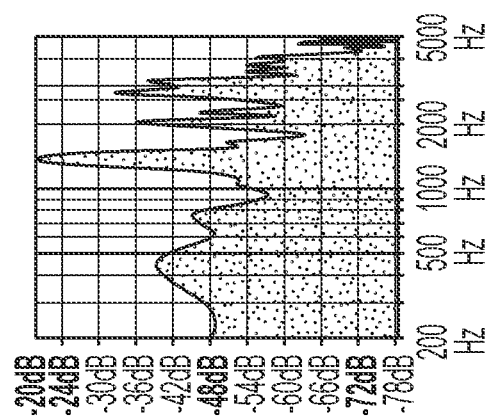
FIG. 10B shows a spectrum resulting from an impulsive stimulus with a Weini K320KT N95 face mask, comprising an air transmissive face mask wall.

FIG. 10B shows the measured spectrum of the radiated sound when an air transmissive Weini K320T N95 mask was mounted on the manikin head to cover the mouth and nose. As can be seen from the spectrum, the N95 air transmissive mask caused a small change in the formant frequencies for the lowest three formants (e.g., a reduction in the frequency of $F_1$ from 500 Hz to 495 Hz) and increased the formant damping for formants $F_1$ and $F_2$. $F_3$ remains visible, though reduced in amplitude compared to $F_2$, as compared to the case with no mask. The clarity of the speech would also be affected by a pronounced dip in the energy introduced near 750 Hz, apparently caused by an antiresonance introduced by the mask.

Figure 10C:
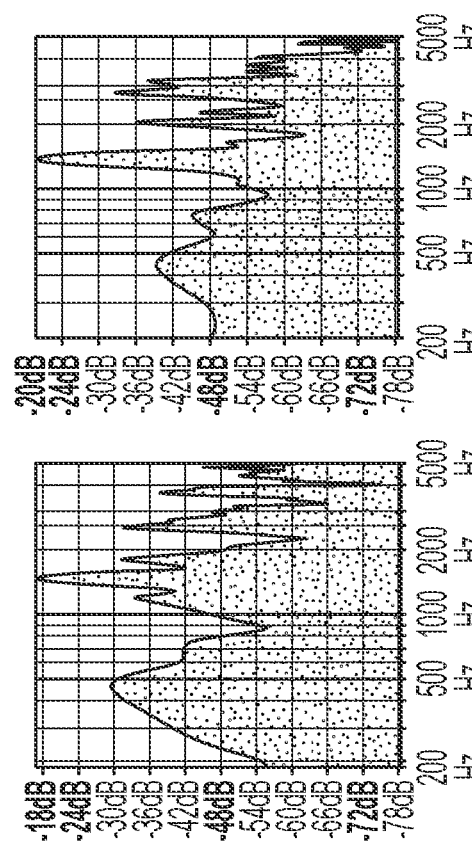
FIG. 10C shows a spectrum resulting from an impulsive stimulus with a Weifei 6011 face mask, comprising an air impervious face mask wall.

FIG. 10C shows the measured spectrum of the radiated sound with an air impervious respiratory mask covering the mouth and nose of the manikin. The mask was a Weifei 6011, designed for use in the presence of organic vapors. The presence of the mask caused a reduction in the frequency of $F_1$, from 500 Hz to 460 Hz, and an increase in the bandwidth of the first and second formants. A third formant is not clearly visible with the mask in place. Also, the spectrum display in FIG. 7C shows evidence of other resonances added by the presence of the mask, for example near 700 Hz, and antiresonances, for example near 2200 Hz introduced by the mask.

Figure 10D:
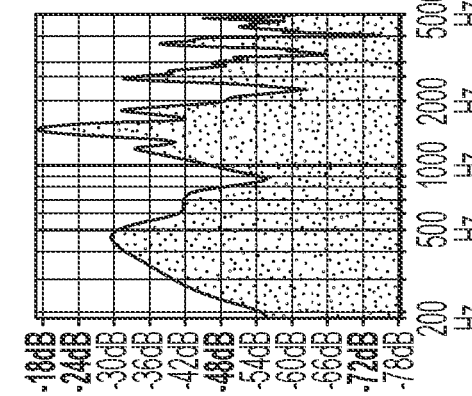
FIG. 10D shows a spectrum resulting from an impulsive stimulus with the Weifei 6011 face mask, with the simulated vocal tract lengthened.

To ascertain the source of the increased energy near 700 Hz in FIG. 10C, the formants of the simulated vocal tract were reduced in frequency by lengthening the simulated vocal tract by about 8%. The resulting spectrum of the radiated energy is shown in FIG. 10D. The increased length of the simulated vocal tract caused $F_1$ to be reduced from 460 Hz to 420 Hz. The reduction in frequency separated $F_1$ from the hypothesized resonance at approximately 700 Hz, making it more visible in the spectral display.

FIG. 10D shows that the ability to move the formants of the simulated vocal tract in an embodiment of the present invention enables the user to clearly distinguish spectral distortion which is generated by the acoustic properties of the mask from distortion caused by the interaction of the mask acoustics with the acoustic properties of the vocal tract.

Changes in the spectrum caused by resonances or anti resonances in the mask may also be differentiated from changes in the radiated spectrum caused by a mask interacting with vocal tract acoustics by shifting the location or damping of the vocal tract formants by shifting the location of the simulated voice source to a location closer to the mouth.

A voice source at the location of the simulated glottis, as in FIG. 7 will result in a radiated spectrum reflecting the signal heard by a listener. Whereas moving the simulated voice source to a location closer to the mask will make the effects of the mask resonances stronger in the signal recorded by the microphone.

Moving the simulated voice source in this way may be desirable if the goal of the user is to optimize mask design and not to only measure the muffling and distortion of a given design.

The signal recorded from the microphone may also be played back through a loudspeaker or earphones for a subjective evaluation.

The system is able to measure and report to the user at least the changes in the frequency and/or damping caused by wearing a mask of one or more vocal tract formants, as well as provide information about any additional resonances or antiresonances introduced by the mask. We illustrate here methods that could be used in the analyzer to provide such information to the user.

The frequency of a formant can be measured in the time domain as the inverse of the period of the oscillations in the acoustic pressure waveform caused by the formant. In the frequency domain, the formant frequency can be estimated by the location of a spectral peak caused by the formant. There are a number of other methods discussed in the literature for estimating the frequency of a formant, as from the cepstrum or an autocorrelation analysis.

The damping of a formant can also be estimated in the time domain or the frequency domain. In the frequency domain the damping can be estimated by the width of the related spectral peak, for example the bandwidth, as defined by the distance in Hertz between the frequencies at which the energy is 3 dB lower than at the peak.

In the time domain the damping can be quantified by the rate of decay of the energy at the formant frequency after the vocal tract is stimulated by an impulsive signal.

Figure 11:
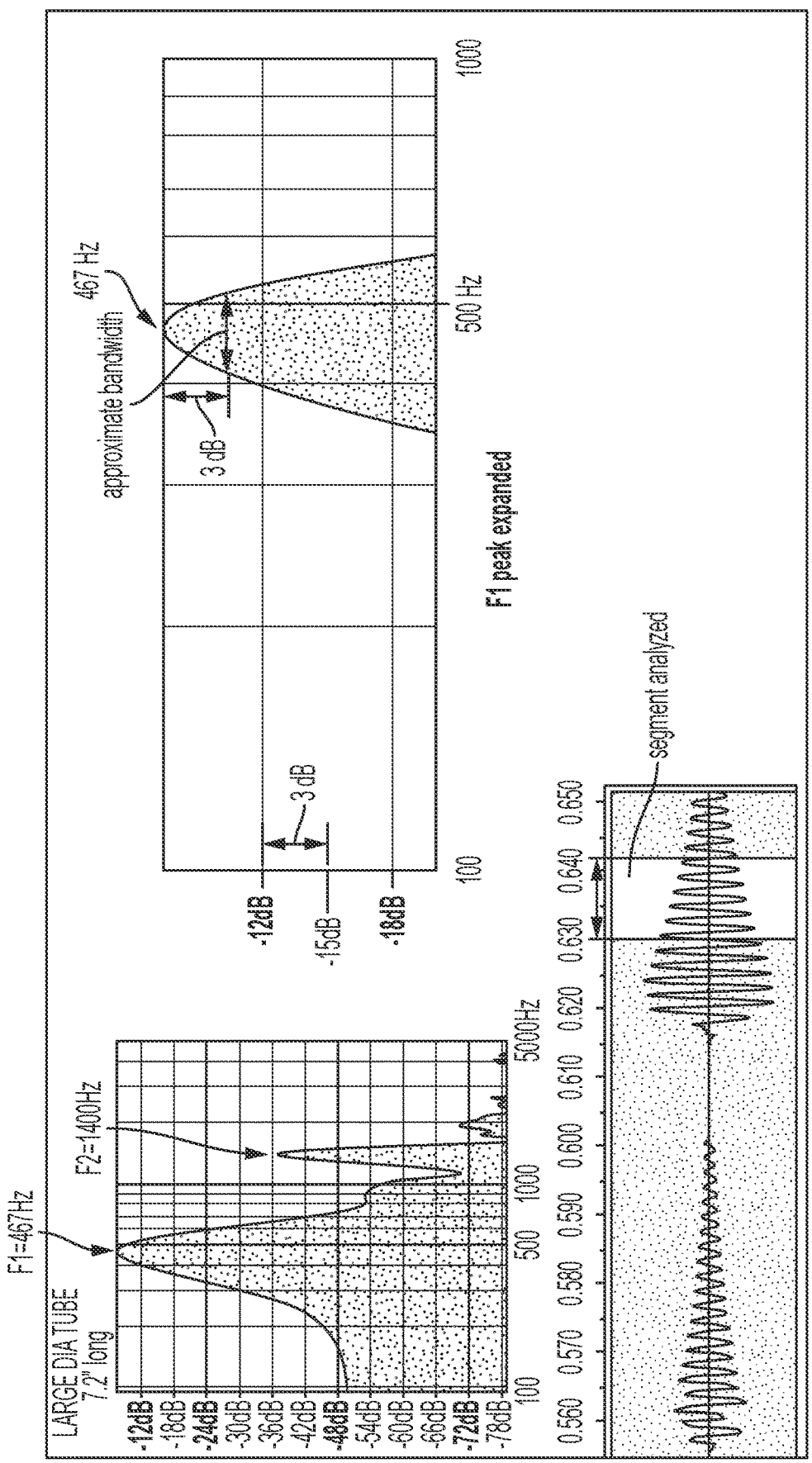
FIG. 11 illustrates an embodiment for measuring the bandwidth of a formant resonance.

In the data shown in FIG. 11, a phenolic tube with an ID of 5/8" and length of approximately 7.2 inches. inserted in a manikin head as a simulated vocal tract, was stimulated by a series of acoustic impulses, with no mask in place. The spectrum indicates a formant bandwidth for the first formant of about 70 Hz, plus or minus 10 Hz. (The high variance in the measurement was due to the graphical technique used.)

Figure 12:
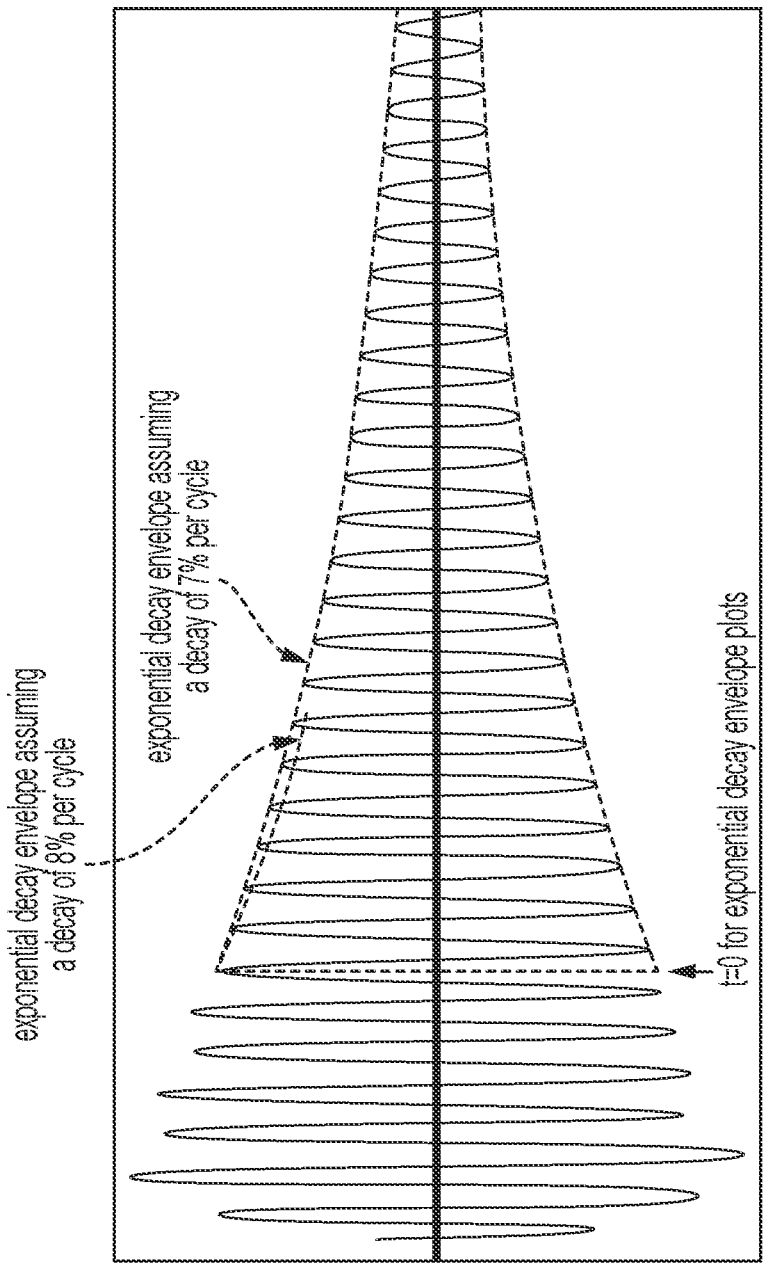
FIG. 12 illustrates a measurement of formant damping by fitting a decaying exponential curve to the response of the simulated vocal tract to an impulsive voice source.

This estimate of the formant bandwidth was verified by measuring the decay in the time waveform, as shown in FIG. 12.

In FIG. 12, the oscillations at $F_1$ were made clearer by attenuating the energy below 200 Hz and above 800 Hz by filters available in the Audacity™ program. The oscillations at $F_1$ were also enlarged graphically in preparing FIG. 12.

A formant resonance at a frequency $f_r$ generates a waveform approximating the function $e^{-Kt} \text{Cos}[(2\pi)(f_r)(t)]$ in response to an impulsive stimulus. The constant K in this expression determines the damping or rate of decay. K can be determined by the percent decay per oscillatory cycle, which is constant throughout an exponential decay.

An exponentially decaying sinusoid is generated by a resonance only during periods in which no stimulus is applied. The first 5 or 6 oscillations in the response to an impulsive stimulus shown in FIGS. 11 and 12 do not follow the exponential decay pattern, the cause being that the acoustic impulse used at the simulated voice source was still active during that period.

In FIG. 12, exponentially decaying envelopes were fitted experimentally to the oscillations that begin at t=0, where t=0 was chosen to exclude the irregular 5 or 6 oscillations. A close to optimal fit to the envelope of the formant oscillations was found when the percent decay per oscillatory cycle was 7.0. In one embodiment, the instant t=0 can be chosen a fixed time after the generation of the acoustic impulse, using the information provided to the analyzer over the link 207.

To show the effect of an increase of formant bandwidth on the rate of exponential decay, the waveforms in FIG. 12 include a segment of a trace computed from an exponential decay of 8% per cycle. A decay rate of 8% per cycle represents a bandwidth increase of approximately 9 Hz over the bandwidth for 7% per cycle.

It is estimated in the art that for formants in the range found in speech, the bandwidth of a formant resonance can be estimated to an accuracy of approximately 5 Hz by superimposing a graph of an exponential decay over the measured decay in formant energy. Stevens K. N., House A. S. (1958). Estimation of Formant Band Widths from Measurements of Transient Response of the Vocal Tract. Journal of Speech and Hearing Research, 1(4), 309-315. This estimate agrees with our measurements.

The frequency and damping of a formant can also be measured by using an inverse filter, such as the Waveview™ program marketed by Glottal Enterprises. In a manual procedure, a formant-based decaying oscillation can be displayed on a computer screen, and the frequency and damping parameters of the filter adjusted to minimize the oscillations on the screen. The settings required to accomplish this can be used as estimates of the frequency and damping of the formant.

For bandwidths much less than the formant frequency, as is usually the case in speech, the formant bandwidth that is equivalent to a % decay per cycle of 7.0 can by computed by the expression: $BW = 2 f_r$ (% decay per cycle/100). For a formant frequency $f_r$ of 467 Hz, this expression yields a BW of approximately 65 Hz, which roughly agrees with the bandwidth measured in FIG. 11.

To estimate the change in bandwidth required to be detectable by superimposing a graph of an exponential decay over the measured decay in formant energy, the waveforms in FIG. 12 include a segment of a trace computed from an exponential decay of 8% per cycle. For a decay rate of 8% per cycle the bandwidth would be approximately 74 Hz, for a bandwidth increase of 9 Hz over the bandwidth for 7% per cycle.

This example indicates that if a decay lasting at least 5 or 6 oscillatory cycles can be used for the analysis, for formants near 500 Hz. formant bandwidth changes of as little as 5 Hz should be clearly measurable using a decay rate analysis A quantitative assessment of the distortion and muffling of the face mask can be made by a comparison between the spectra with and without the face mask (e.g., between 10A and 10B, or 10A and 10C). In one embodiment, the comparison involves at least one of a comparison between the center frequency of one or more formants, the bandwidth of one of more formants, or the amplitude of one of more formants. In general, the greater the shift in the center frequency of a given formant, the greater the distortion and muffling. Likewise, the greater the change in bandwidth or amplitude (or both) of a formant, the greater the greater the distortion and muffling.

For example, the Weini K320T N95 mask (see FIG. 10B) shifted $F_1$ by 5 Hz, increased the bandwidth (e.g., damping) of formants $F_1$ and $F_2$, and changed the amplitude of $F_1$ and $F_3$. The Weifei 6011 mask (see FIG. 10C) caused a reduction in the frequency of $F_1$ by 40 Hz and $F_2$ by 20 Hz, an increase in the bandwidth of $F_1$ and $F_2$, and a change in amplitude of $F_1$. As discussed, the third formant is not clearly visible with the mask in place. The spectral plot also shows evidence of other resonances added by the presence of the mask.

As a non-limiting example, these shifts in frequency and changes in bandwidth and amplitude are factors that may be used as inputs into a distortion value. As discussed, a greater the shift in frequency and changes in bandwidth and/or amplitude likely mean a greater distortion value. In some embodiments, the first three formants are considered. However, in some embodiments, only the first or only the first and second formants are considered. Furthermore, when multiple formants are considered, each formant can contribute equally to the distortion value, or, the formants could be weighted. For example, even a small shift in frequency of the first formant can produce a large amount of distortion and muffling.

With respect to the example of FIGS. 10A-10C, in this case, the face mask of FIG. 10C results in a higher distortion value than 10B. For example, with respect to the frequency shift, the mask of 10C shifted $F_1$ by 40 Hz and $F_2$ by 20 Hz, while the face mask of 10B only shifted $F_1$ by 5 Hz. With respect to damping/bandwidth and amplitude changes, using $F_1$ as an example, the face mask of 10C resulted in a greater change in amplitude and bandwidth. While the exact amount of change depends on the definition used in the particular embodiment, the first formant of 10C clearly shows a much greater broadening of the peak under any definition (for example, simply using the −3 dB width of the peak). In addition, the frequency shifts and damping would likely need to be normalized in order to convert to a distortion value. Thus, in an embodiment where only the first formant is considered and the frequency shift and damping are the only factors, the face mask of 10C would produce a higher distortion value. In this manner, the qualitative property of reduction in speech intelligibility of the face masks of 10B and 10C is quantified.

The following are non-limiting examples of calculations of distortion values using the example of FIGS. 10A-10C. In this example, for simplicity, only the first formant is considered and only the frequency shift and bandwidth change are considered, and are each considered equally. Any normalization routine (which is well-known in the art) may then be used.

In one example, the change in frequency or bandwidth of a formant caused by a particular mask can be summarized in a numerical distortion index to allow the comparison of various masks. One such definition of a distortion index might be formed by first considering values of normalized frequency shift, $dF_1$, and bandwidth change, $dB_1$, defined as follows (note that subscript "m"=mask, subscript "nm"=no mask, and bandwidth change is assumed to be an increase since the no mask condition results in a minimum bandwidth):

$$\Delta F_1 = dF_1 = |F_{1m} - F_{1nm}|/F_{1nm}$$

$$\Delta BWF_1 = dB_1 = (B_{WF1m} - BWF_{1nm})/BWF_{1nm}$$

Thus, if a first formant with a frequency value of 500 Hz with no mask and a bandwidth of 80 Hz with no mask, has a frequency value of 470 Hz and a bandwidth of 120 Hz with a particular mask, the value of $dF_1$ would be 30/500=0.06, and the value of $dB_1$ would be equal to (120−80)/80=0.50.

Each of these values could be normalized by dividing it by the minimum perceptible value, as determined experimentally, which might be 0.01 for $dF_1$ and 0.1 for $dB_1$. This would yield a value of 6.0 for frequency shift and a value of 5.0 for bandwidth increase.

Assuming that frequency shift and bandwidth increase contribute equally to distortion, these two measures may be added together to give them equal weighting, resulting in a single numerical measure of the speech distortion and muffling. In this case the combined measure would be 11.0.

As another example, a normalization routine may find that the maximum shift in frequency is 50 Hz and the maximum change in bandwidth is 500 Hz, and may use a range of 0-100 for distortion value. In this case, because the frequency shift and bandwidth change are considered equally, each would contribute 0-50 to the distortion value. Using a simple linear normalization, the shift of 5 Hz for the face mask of 10B would add 5 to the distortion value. If the definition of bandwidth showed an increase of 50 Hz, the face mask of 10B would add 5 to the distortion value (500/50=50/5). Thus, the distortion value for the face mask of FIG. 10B would be 5+5=10. Likewise, the shift of 40 Hz to $F_1$ by the face mask of FIG. 10C would add 40 to the distortion value. If the definition of bandwidth showed an increase in 200 Hz, the face mask of 10C would add 20 to the distortion value (500/200=50/20). Thus, the distortion value for the face mask of FIG. 10C would be 40+20=60. Comparing the distortion values, 10 for the face mask of FIG. 10B and 60 for the face mask of FIG. 10C, shows that the face mask of FIG. 10C distorts and muffles the voice of the user of the face mask more than the face mask of FIG. 10B. A person of ordinary skill in the art will understand that the foregoing example is for explanatory purposes only, and is not limiting.

Figure 13:
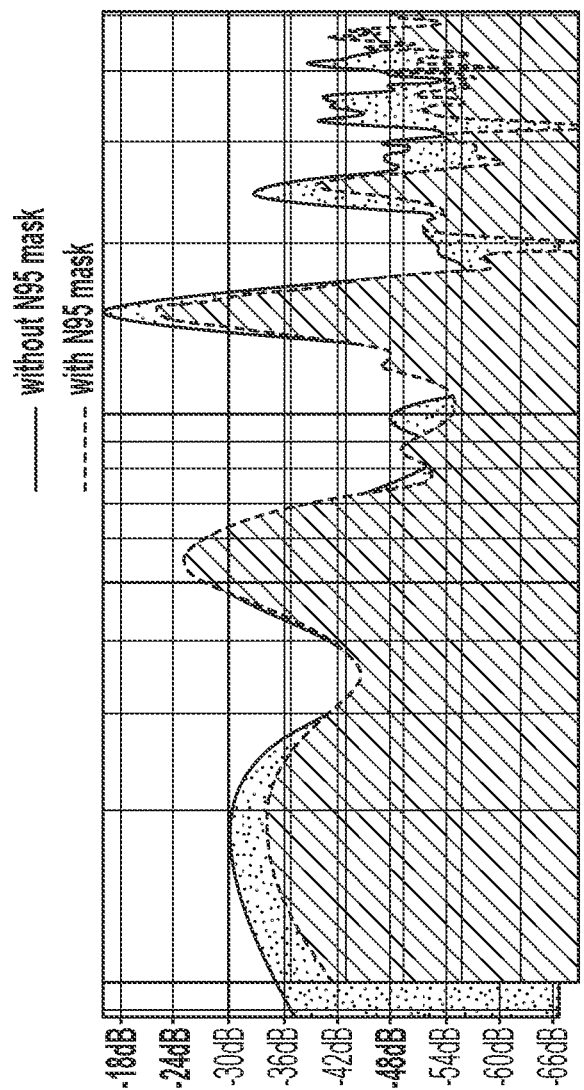
FIG. 13 shows overlaid spectra obtained with and without the face mask.

As discussed, the analyzer 206 may compare the spectra with and without the face mask 204. In one embodiment, the analyzer may further comprise a graphical user interface or other display for visualizing such a comparison of formant spectra. For example, FIG. 13 shows overlaid spectra obtained with and without the face mask 204. In this case, the display of analyzer 206 shows that for a particular N95 face mask 204, the mask 204 caused a reduction in the amplitude of the second formant, and a shifting of the frequency of the third formant.

Figure 14:
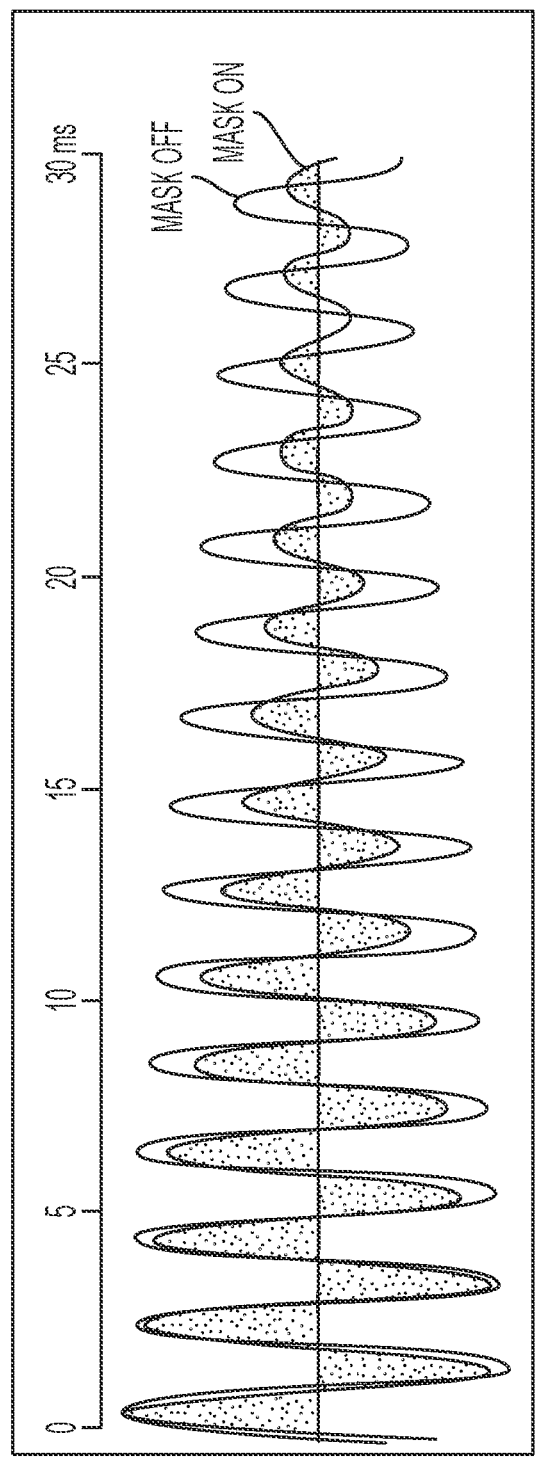
FIG. 14 illustrates overlaid time waveforms of first formant energy in response to an acoustical impulse with and without use of a Moldex™ mask #3400 designed to block fumes, dust and mist.

FIG. 14 shows further overlaid time waveforms of first formant energy with and without a particular face mask 204, in this case a mask designed by the manufacturer Moldex™ to capture fumes, dust and mist. Said overlay shows the increase in formant damping and decrease in formant frequency caused by use of the mask. As shown in FIG. 14, graphical overlays in the time domain are advantageous in clearly showing formant damping caused by the face mask, as indicated by the decaying waveform of the mask waveform.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods for objectively measuring the effect of wearing a mask on the acoustical properties of speech have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A system, comprising
   a simulated voice source, configured to produce a sound;
   a simulated vocal tract, acoustically coupled to the simulated voice source;
   a face mask, acoustically coupled to the simulated vocal tract;
   a microphone, configured to receive the sound and produce a signal; and
   an analyzer, configured to receive the signal from the microphone.

2. The system of claim 1, further comprising a manikin head or other facial structure configured to simulate fitting of the face mask onto a face.

3. The system of claim 1, wherein the analyzer produces a quantitative assessment of the distortion and muffling of the face mask.

4. The system of claim 1, wherein the analyzer produces a quantitative assessment of the distortion and muffling of the face mask by comparing at least one spectrum obtained with the face mask and at least one spectrum obtained without the face mask.

5. The system of claim 1, wherein the analyzer produces a quantitative assessment of the distortion and muffling of the face mask by comparing at least one spectrum obtained with the face mask and a control.

6. The system of claim 1, wherein the analyzer uses an inverse filter.

7. The system of claim 1, wherein the analyzer produces a metric of the distortion and muffling of the face mask.

8. The system of claim 1, wherein the analyzer measures at least one of a frequency, amplitude, or bandwidth of a formant.

9. The system of claim 1, wherein the analyzer assesses the distortion and muffling of the face mask by measuring at least one of a shift in frequency, change in amplitude, or change in bandwidth damping of a formant.

10. The system of claim 1, further comprising a link between the analyzer and the simulated voice source.

11. The system of claim 1, wherein the analyzer comprises a display configured to visualize a comparison of formant spectra in the time or frequency domain.

12. A method comprising the steps of:
    producing a sound with a simulated voice source;
    providing a simulated vocal tract, acoustically coupled to the simulated voice source;
    providing a face mask, acoustically coupled to the simulated vocal tract;
    receiving the sound and producing a signal with a microphone; and
    receiving the signal from the microphone with an analyzer.

13. The method of claim 12, further comprising providing a manikin head or other facial structure configured to simulate fitting of the face mask onto a face.

14. The method of claim 12, wherein the analyzer produces a quantitative assessment of the distortion and muffling of the face mask.

15. The method of claim 12, wherein the analyzer produces a quantitative assessment of the distortion and muffling of the face mask by comparing at least one spectrum obtained with the face mask and at least one spectrum obtained without the face mask.

16. The method of claim 12, wherein the analyzer produces a quantitative assessment of the distortion and muffling of the face mask by comparing at least one spectrum obtained with the face mask and a control.

17. The method of claim 12, wherein the analyzer uses an inverse filter.

18. The method of claim 12, wherein the analyzer produces a metric of the distortion and muffling of the face mask.

19. The method of claim 12, wherein the analyzer measures at least one of a frequency, amplitude, or bandwidth of a formant.

20. The method of claim 12, wherein the analyzer assesses the distortion and muffling of the face mask by measuring at least one of a shift in frequency, change in amplitude, or change in bandwidth damping of a formant.

21. The method of claim 12, further providing a link between the analyzer and the simulated voice source.

22. The method of claim 12, wherein the analyzer comprises a display configured to visualize a comparison of formant spectra in the time or frequency domain.

* * * * *